No. 666,224. Patented Jan. 15, 1901.
R. E. VAN COURT.
SMOOTHING IRON.
(Application filed Aug. 3, 1900.)
(No Model.)
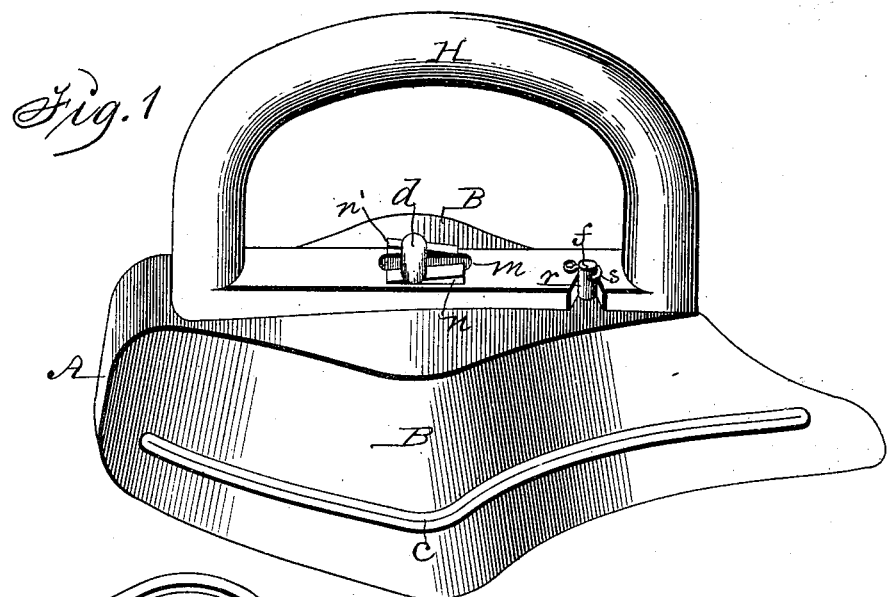
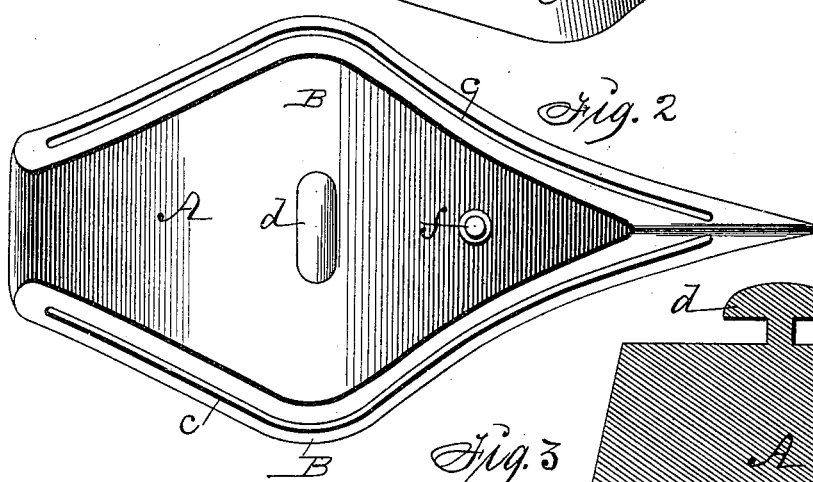
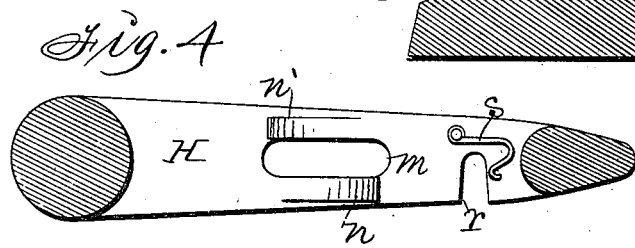
Witnesses: Inventor: Robert E. Van Court,
R. G. Orwig.
F. C. Stuart. By Thomas G. Orwig, Attorney.

UNITED STATES PATENT OFFICE.

ROBERT E. VAN COURT, OF NEWTON, IOWA, ASSIGNOR OF ONE-THIRD TO PERRY ENGLE, OF SAME PLACE.

SMOOTHING-IRON.

SPECIFICATION forming part of Letters Patent No. 666,224, dated January 15, 1901.

Application filed August 3, 1900. Serial No. 25,756. (No model.)

*To all whom it may concern:*

Be it known that I, ROBERT E. VAN COURT, a citizen of the United States, residing at Newton, in the county of Jasper and State of Iowa, have invented a new and useful Smoothing-Iron, of which the following is a specification.

My object is to provide an improved smoothing-iron adapted for all the common uses of a smoothing-iron, and specially adapted for ironing and polishing shirts having plaits and gathers and garments having frills, flounces, and ruffles.

My invention consists in the construction and combination of an iron, a detachable handle, and handle-fastener, as hereinafter set forth, pointed out in my claims, and illustrated in the accompanying drawings, in which—

Figure 1 is a perspective view of the iron, showing the handle attached and fastened as required for practical use. Fig. 2 is a top view of the iron, showing the peculiar shape thereof and the handle detached. Fig. 3 is a transverse central sectional view showing a stud on the top and grooves in the side faces. Fig. 4 is a top view of the horizontal portion of the handle, showing a longitudinal slot, inclined planes at the side of the slot, a transverse slot, and a latch pivoted to the handle.

The letter A designates the main body portion of the iron. It is pointed at its front, has swells B at its sides and central portion, and the corners at the top and bottom of the rear portion are rounded off. The iron is wider at its bottom than at its top, and consequently its sides are inclined, and in the lower portions of the side faces are grooves c, that extend from the pointed front to the rear portion to admit the free edge of a plait or gather after it is ironed and while an adjoining plait is being ironed.

The peculiar shape of the iron adapts the broad flat portion of the bottom for all the common uses of a smoothing-iron. The pointed front, that has an inclined top face and inclined sides, is specially adapted for entering and passing through gatherings in shirt-waists and sleeves and plaits in shirt-bosoms and flounces and ruffles in dresses and other garments. The vertically-inclined side faces having grooves in their lower portions are advantageous for keeping gathers open while the bottom surface of the iron is applied between gathers, plaits, or ruffles.

The top surface of the iron is slightly curved upward from front to rear, and a stud $d$, that has an oblong head, is formed on or fixed to the central and highest part of the top in such a manner that the head will extend transversely, as shown in Fig. 2. A pin $f$ is fixed in the top of the front portion of the iron to be engaged by a latch.

H is a detachable handle slightly curved longitudinally on its bottom face, as shown in Fig. 1, and as required to fit on the upwardly-curved top face of the iron A. It has a longitudinal slot $m$, adapted to allow the head of the stud $d$ to pass through upwardly when the handle is in a right-angled position to the iron. It also has inclined planes $n$ and $n'$ at the sides of the slot that incline in reverse directions relative to each other in such a manner that when the elongated head of the stud has passed through the slot $m$ in the handle and the handle is turned a quarter-revolution on the stud the under faces of the end portions of the elongated head will bind on both the inclined planes simultaneously to clamp the overlying curved surfaces of the bottom of the handle and the top of the iron closely together, as required to aid in rigidly and detachably fixing the handle to the iron. To prevent any lateral motion of the handle, a slot $r$ is formed in one of the edges of the front portion of the horizontal part of the handle, and a latch $s$ is pivoted near the slot in such a manner that the latch can be placed into engagement with the fixed pin $f$ to aid in securely fastening the handle to the iron.

Having thus described the construction of my invention, its practical utility will be readily understood by persons familiar with the art to which it pertains; and

What I claim as new, and desire to secure by Letters Patent, is—

1. A smoothing and polishing iron that is pointed at its front, has lateral swells at the central portions of its sides, vertically-inclined side faces, grooves near the bottoms of the sides and rounded corners at its rear end, as shown and described for the purposes stated.

2. A smoothing and polishing iron comprising a main body portion having a pointed front end, swells at the central parts of its sides, vertically-inclined sides extending from end to end, rounded top and bottom corners at its rear end, a longitudinally-curved top face, a fixed stud at the center of its top face provided with an elongated head projecting laterally, a fixed pin in the front part of the top face, a detachable handle having a curved bottom face fitted to the curved top face of the iron and a longitudinal slot to admit the elongated head of the fixed stud, planes at the sides of the slot inclined in reverse ways, a slot in one edge of the horizontal part of the handle to admit the fixed pin in the top of the iron and a latch pivoted close to said slot to engage said fixed pin, arranged and combined to operate in the manner set forth for the purposes stated.

ROBERT E. VAN COURT.

Witnesses:
O. N. WAGLEY,
E. L. EARLEY.